US006327593B1

(12) United States Patent
Goiffon

(10) Patent No.: US 6,327,593 B1
(45) Date of Patent: Dec. 4, 2001

(54) AUTOMATED SYSTEM AND METHOD FOR CAPTURING AND MANAGING USER KNOWLEDGE WITHIN A SEARCH SYSTEM

(75) Inventor: David A. Goiffon, Shoreview, MN (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/220,209

(22) Filed: Dec. 23, 1998

(51) Int. Cl.$^7$ ..................................................... G06F 17/30
(52) U.S. Cl. ................................................ 707/102; 707/6
(58) Field of Search ........................................ 707/102, 6

(56) References Cited

U.S. PATENT DOCUMENTS

| | | | |
|---|---|---|---|
| 5,062,074 | * 10/1991 | Kleinberger | 707/5 |
| 5,278,980 | * 1/1994 | Pedersen et al. | 707/4 |
| 5,428,712 | * 6/1995 | Elad et al. | 706/46 |
| 5,488,725 | * 1/1996 | Turtle et al. | 707/5 |
| 5,708,829 | * 1/1998 | Kadashevich et al. | 707/531 |
| 5,724,571 | * 3/1998 | Woods | 707/5 |
| 5,848,409 | * 12/1998 | Ahn | 707/3 |
| 5,966,703 | * 10/1999 | Burrows | 707/2 |
| 6,029,195 | * 2/2000 | Herz | 709/219 |
| 6,035,269 | * 3/2000 | Kim | 704/9 |
| 6,195,651 | * 2/2001 | Handel et al. | 707/2 |

* cited by examiner

Primary Examiner—Wayne Amsbury
(74) Attorney, Agent, or Firm—Beth L. McMahon; Charles A. Johnson; Mark T. Starr

(57) ABSTRACT

A system and method is provided for allowing users to interactively modify a search index used in performing concept-based searches. The system includes a repository for storing a network of natural language concepts. The repository further stores associations between selected ones of the natural language concepts and other data items that are cataloged according to the natural language concepts, wherein the data items may be stored within the repository, or on one or more remote systems. A user provides one or more natural language concepts as a search query used to locate associated ones of the data items. Subsequent iterations of a search may be performed to modify the scope of the search. After successful search results are obtained, the user may create one or more new associations, wherein each association relates any of the one or more natural language concepts included within a query with any selected one of the data items located during any iteration of the search. Similarly, the user may delete selected associations existing between located ones of the natural language concepts and selected ones of the data items. This modification of the knowledge base allows the search index to evolve to reflect the needs of the user. According to one aspect of the invention, the network of natural language concepts includes relationships between concepts that organize the concepts according to generalizations and specifications. The user is allowed to create additional relationships between any of the natural language concepts that are located during any iteration of a search such that the organization of the concept network is tailored to user needs. The user is further allowed to store additional natural language concepts in the repository, and to relate the additional natural language concepts both to other concepts, and to selected ones of the data items. According to another aspect of the invention, a user display is provided to list, for all iterations of a search, all query terms specified by a user, all located concepts, and all located data items. The user creates and/or deletes associations between the displayed concepts and/or between concepts and data items using either a standard "drag and drop" interface, or using a sequence of "copy and paste" keystrokes.

33 Claims, 12 Drawing Sheets

AUTOMATED SYSTEM AND METHOD FOR CAPTURING AND MANAGING USER KNOWLEDGE WITHIN A SEARCH SYSTEM

CROSS-REFERENCES

This patent application is related to the U.S. patent application Ser. No. 09/172,423 entitled, "System and Method for Developing a Selectably-Expandable Concept-Based Search", now pending, filed on Oct. 14, 1998 by Goiffon et al., which is assigned to the assignee of the present invention, and which is incorporated herein by reference in its entirety.

This patent application is further related to the U.S. patent application Ser. No. 09/173,095, entitled, "Object Management System Supporting the Use of Application Domain Knowledge Mapped to Technology Domain Knowledge", filed on Oct. 14, 1998 by Goiffon et al., now U.S. Pat. No. 6,226,792 which is assigned to the assignee of the present invention, and incorporated herein by reference in its entirety.

FIELD OF THE INVENTION

This invention relates generally to an improved system and method for use in performing a concept-based search, and more specifically, to a system and method for allowing a user to modify a network of natural language concepts used in performing a search on a corpus of data items, wherein the network may be modified to associate search concepts provided by the user during one or more unsuccessful iterations of a search with those data items discovered during successful iterations of the search.

DESCRIPTION OF THE PRIOR ART

Today's data processing systems are capable of storing large volumes of data. The density of storage devices continues to increase at the same time the prices for such devices are falling. In addition, current networking capabilities allow multiple storage devices and file servers to be interconnected so that databases can be shared across systems. As a result, users of current computer systems are provided with access to an unprecedented amount of information.

The internet is a prime example of this information explosion. It is estimated that between 30 and 50 million pages are currently available to users of the internet. In addition to this publicly-available documentation, many users are also provided with other proprietary sources of information, such as those that are available via corporate intranet sites. Information may be obtained from still other sources, such as newsgroups.

To take advantage of the large amount of information made available by technological advances, the data must be readily accessible. Users must be able to locate and retrieve information that is needed in a timely manner. To do this, information retrieval systems must be developed that allow users to identify the best or most relevant data associated with a user request.

Many challenges exist when developing an information retrieval system that is capable of efficiently providing meaningful search results. One problem is that the cataloging of information is, at least to some extent, a subjective process. As a result, information may be indexed in a manner that is not intuitive to an end user. Additionally, a user drafting a search request may not have the knowledge necessary to specify terminology that will yield desired search results on the first search attempt. On the other hand, a user may fashion a query to include terms that are unique to a given industry, trade, or even business entity, and the query terminology and particular term-usage may not be reflected in the index of the information retrieval system. Other factors, for example regional dialects, may further influence the construction of a given search query. Any of these factors may result in a query that does not produce expected search results. As a result, a user is forced to refine the original query and initiate another search. Multiple iterations of a search may be necessary before adequate results are achieved. This wastes time, and may never sufficiently provide the user with desired information.

To improve efficiency, it is desirable to provide a search tool that may be modified throughout the life of the system to accurately reflect both the information being cataloged, and the search practices of the individual users. U.S. Pat. No. 5,708,829 to Kadashevich et al. describes a system for automatically managing a search index such that the index accurately reflects the information being classified. The system analyzes a corpus of information that is to be cataloged. The system generates a plurality of topic words from the corpus of information, wherein the topic words are to be added to the search index. The system ensures that the search index is updated to include additional search categories that accurately reflect new information being cataloged by the system. However, the system does not take into account user preferences or specific user knowledge in creating the additional index terms.

A search system that allows a user to update a search index to reflect search terminology preferred by the user is described in the U.S. patent application Ser. No. 09/172,423 entitled, "System and Method for Developing a Selectably-Expandable Concept-Based Search", filed on Oct. 14, 1998 by Goiffon et al., which is assigned to the assignee of the present invention. According to the described system, various tools are provided that allow a user to edit the contents of a search index to incorporate additional terms. The tools also allow a user to modify the organizational structure of the search index. However, the system does not provide an efficient means for allowing a user to associated search index terms with desired search results so that future searches may be accomplished without the need to perform multiple search iterations to obtain acceptable results.

What is needed is a system for managing a search index that allows the index and index organization to evolve by selectively creating associations between items of domain knowledge provided by the user as search criteria and items of information discovered during one or more iterations of the search and that were not previously associated with the specified search criteria. These newly-created associations may then be used to perform subsequent searches on the corpus of information being indexed.

OBJECTS

It is a primary object of the current invention to provide an improved system and method for managing a search index;

It is another object of the invention to provide a system that allows users to interactively modify a search index to include search terms not previously included in the index;

It is yet another object of the invention to provide a system wherein a user may perform a search during multiple search iterations, and wherein the search results obtained during any search iteration may be associated with the query terms provided during any other search iteration;

It is a further object of the invention to provide a hierarchical network of search terms for use in a search system, wherein the network of search terms may be selectively modified during the search process to reflect the vocabulary and linguistic patterns of any user of the search system;

It is another object of the invention to provide a system for allowing a user to create associations between various concepts that are organized within a network of natural language concepts, wherein the network of concepts is used to perform a concept-based search;

It is a further object of the invention to provide a system for allowing a user to selectively create associations between concepts included in a search index and selected items being cataloged using the search index;

It is yet another object of the invention to provide an efficient interactive interface for allowing a user to create associations between multiple items in a search index;

It is another object of the invention to provide an efficient interactive interface for allowing a user to easily create associations between concepts included in a search index and selected items being cataloged using the search index;

It is yet another object to utilize an object-oriented repository to implement a hierarchical concept tree for use in interactive query development, and wherein the hierarchical concept tree may be used to search for other objects storing information of interest to a user;

It is a still further object to utilize a hierarchical concept tree to interactively catalog objects storing meta-data, wherein each of the objects storing meta-data further catalogs and describes another group of information; and It is a further object to provide a software management system for interactively managing and cataloging software constructs in a manner that allows user preferences to influence the indexing scheme of the system.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention.

SUMMARY OF THE INVENTION

The forgoing objects and other objects and advantages are provided in the current invention, which is a system and method for allowing users to interactively modify a search index used in performing concept-based searches. The system includes a repository for storing a network of natural language concepts. The repository further stores associations between selected ones of the natural language concepts and selected data items that are being cataloged using the natural language concepts as an index. The data items may reside in the repository or on one or more remote systems. A search may be performed on the data items by specifying one or more of the natural language concepts as query terms used to locate any associated ones of the data items.

During a first iteration of a search, a user provides one or more natural language concepts. A search of the repository is performed to locate any related ones of the data items, which are then displayed for the user as search results. A user may thereafter refine the scope of the search by providing additional natural language concepts during one or more additional iterations of the search. After successful search results are obtained, the user may create one or more new associations, wherein each association relates any selected one of the natural language concepts located during any iteration of the search with any selected one of the data items located during any iteration of the search. Similarly, the user may delete selected relationships existing between located ones of the natural language concepts and selected ones of the data items. The knowledge base stored in the repository thereby evolves to reflect the knowledge and preferences of an individual user. Subsequently performed searches employing similar concepts will therefore yield successful search results without the need for multiple search iterations.

According to one aspect of the invention, the network of natural language concepts includes relationships between ones of the concepts to organize the concepts according to generalizations and specifications. The user is allowed to create additional relationships between any of the natural language concepts located during any iteration of the search such that the organization of the concept network may be tailored to user needs. The user is further allowed to store additional natural language concepts in the repository, and to relate the additional natural language concepts both to other concepts, and to selected ones of the data items. In this manner, query terms that were previously ineffective in locating desired search results are added to the knowledge base so that future search efforts may include the new terminology.

The invention of the preferred embodiment includes a user interface for providing a display of all query terms specified by the user and all concepts located during all iterations of the search.

The display further indicates all search results obtained for each search iteration. Associations between multiple concepts and/or between concepts and data items that are included in the display may be created using either a standard "drag and drop" interface, or using various keystrokes in a manner known in the art.

According to another aspect of the invention, the system includes a browse capability to allow a user to view a list of concepts and concept relationships stored in the repository. A search query may be composed by selecting various ones of the existing concepts from the list of concepts provided by the browse function, and/or by manually entering terms to be included in the query.

A search expansion feature is also provided to allow a user to selectively expand the scope of the search. According to this feature, any concept that has one or more predetermined selected relationship(s) to a concept located using the user query is also included in the search. For example, a user may specify that all concepts providing a more generalized description of a concept located using the query terms may be included in the search. Similarly, a user may selectively include within the search all concepts that provide a more particularized description of a concept located using the query terms. In this manner, the scope of the search is automatically expanded to locate additional ones of the data items.

According to yet another aspect of the current invention, the search system is tailored to catalog data items that each stores meta-data descriptive of an associated software module such as a program, subroutine, database, and the like. The search system may be used by an Information Technology group to catalog and manage the various software modules to both track interdependencies existing between the modules, and to make the modules available for potential reuse.

Still other objects and advantages of the present invention will become readily apparent to those skilled in the art from the following detailed description of the preferred embodiment and the drawings, wherein only the preferred embodiment of the invention is shown, simply by way of illustration of the best mode contemplated for carrying out the invention. As will be realized, the invention is capable of other and different embodiments, and its several details are capable of modifications in various respects, all without departing from the invention. Accordingly, the drawings and description are to be regarded to the extent of applicable law as illustrative in nature and not as restrictive.

BRIEF DESCRIPTION OF THE FIGURES

The present invention will be described with reference to the accompanying drawings.

DETAILED DESCRIPTION OF THE PREFERRED EMBODIMENTS

Figure 1:
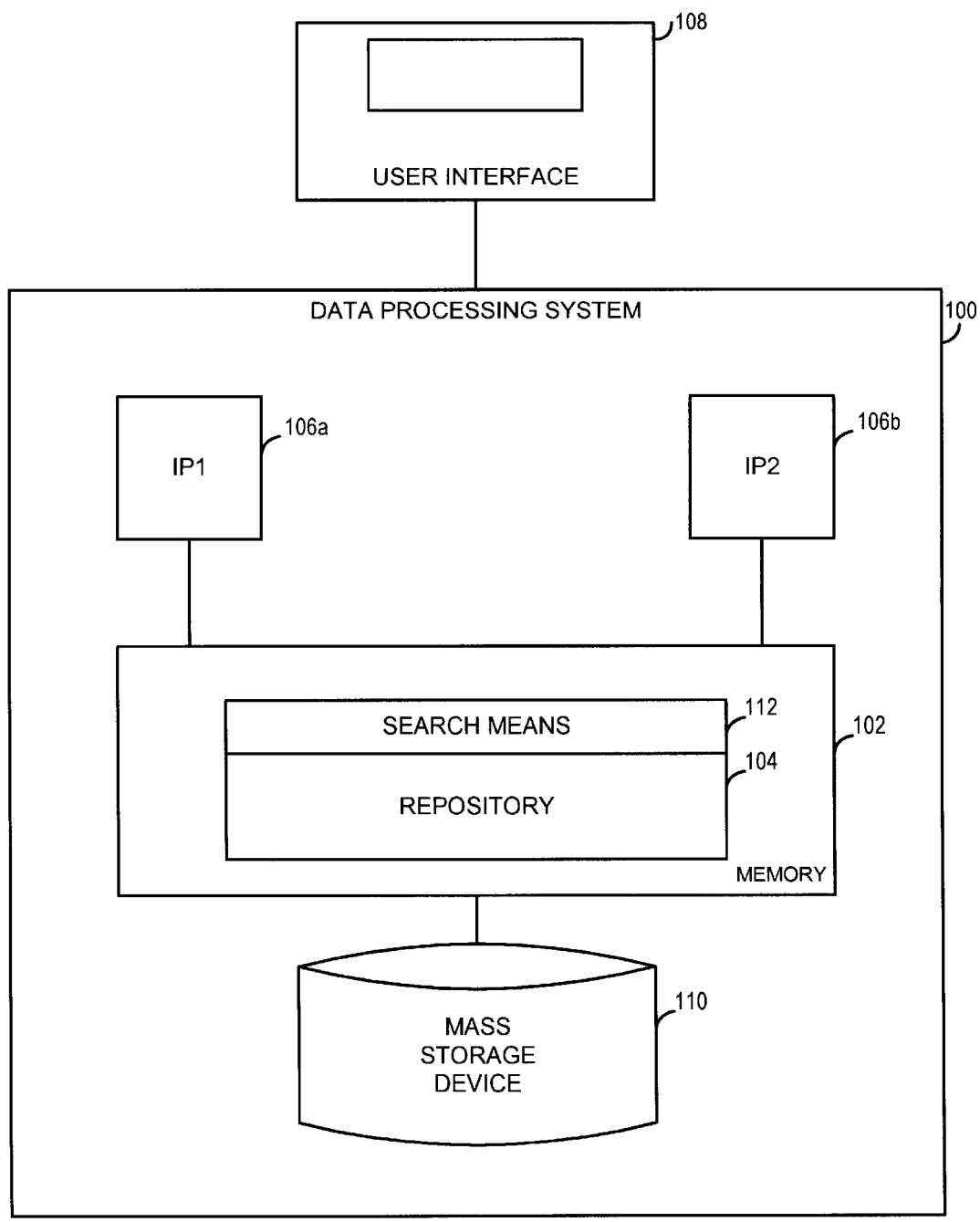
FIG. 1 is a block diagram of a Data Processing System used to implement the current invention.

FIG. 1 is a block diagram of Data Processing System 100 that may be used as a system for performing searches in accordance with the present invention. The system includes a Memory 102 for storing data signals. Memory 102 includes a Repository 104 for storing natural language concepts that can be used to develop a search query as will be discussed further below. The Memory is coupled to one or more Instruction Processors (IPs) shown as IP1 106a and IP2 106b for operating on the data signals stored in Memory 102. The system further includes User Interface 108 such as a display terminal that provides the user with access to Data Processing System 100. Data Processing System 100 may further include mass storage devices such as that shown as Mass Storage Device 110 coupled to Memory 102. The system of the preferred embodiment further includes a search tool shown as Search Means 112 stored in Memory 102. Search Means 112, which interfaces to Repository 104, provides the user search interface and search routines for performing searches on the contents of Repository 104 in response to user requests provided via User Interface 108. In the preferred embodiment, Search Means 112 is a software program called the Element Locator, as will be discussed in detail below.

Figure 2:
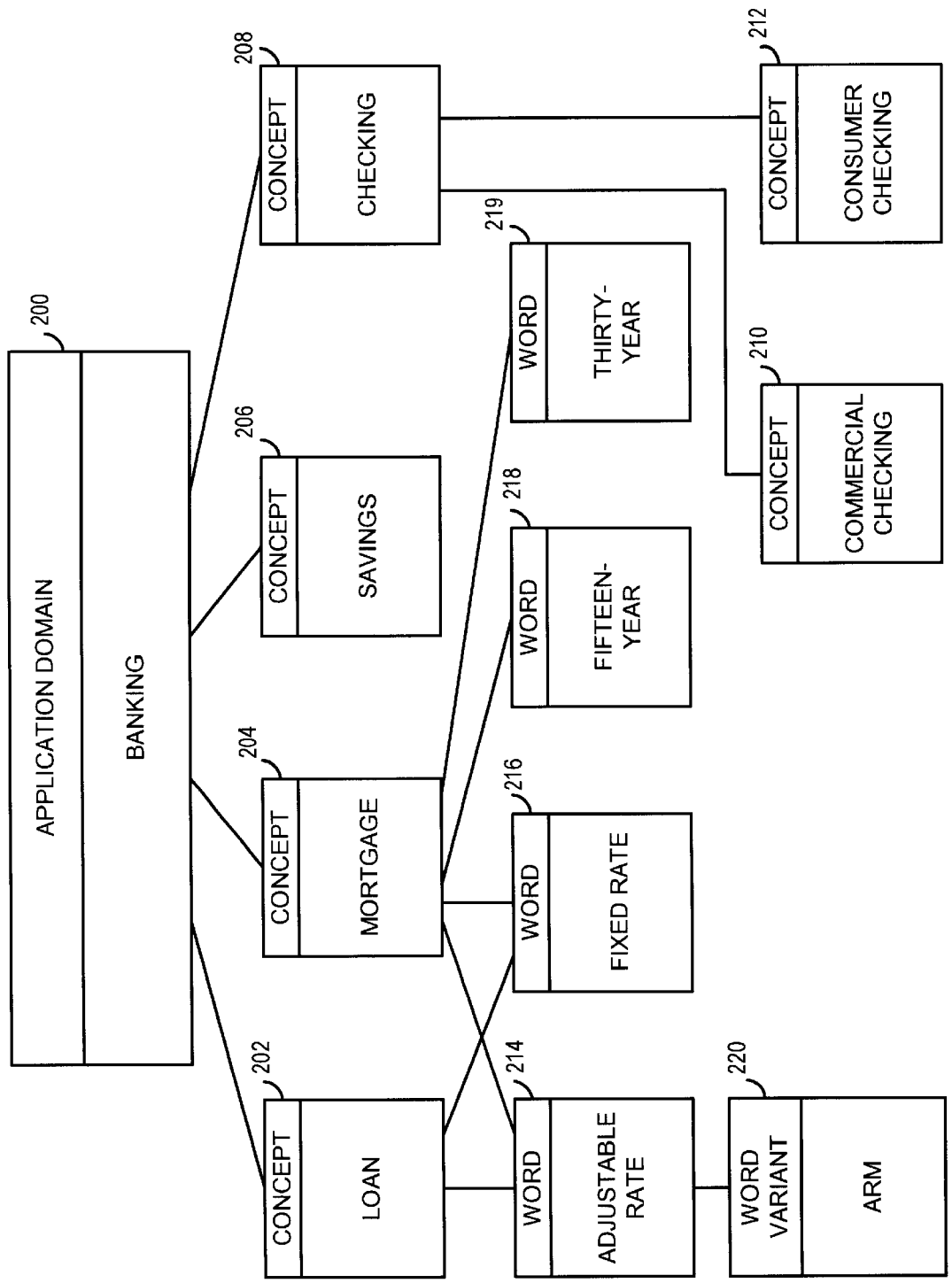
FIG. 2 is a block diagram representing a hierarchical tree structure for organizing natural language concepts.

FIG. 2 is a block diagram representing a network used to organize natural language concepts based on similarities and differences between the concepts. In the preferred embodiment, this network is organized as a hierarchical tree structure. This type of tree structure could be used to perform a search as will be discussed further below. Natural language concepts are organized into broad categories called "Application Domains". The Application Domain for "Banking" is shown in Block 200. Below an Application Domain in the hierarchical tree structure are stored natural language concepts relating to the general concept "Banking". For example, in FIG. 2, concepts such as "Loan", "Mortgage", "Savings", and "Checking" are shown in Blocks 202, 204, 206, and 208, respectively. Each concept may further be related to other child concepts wherein each child concept exists immediately below the related (parent) concept in the tree hierarchy. The child concept is similar to the parent concept, but with specific differences. For example, the concepts "Commercial Checking" and "Consumer Checking" in Blocks 210 and 212, respectively, are shown as child concepts of concept "Checking". Each concept may be related to multiple other concepts. For example, in addition to being related to concept "Checking", concept "Consumer Checking" in Block 212 could also be related to a concept called "Consumer Banking". The hierarchical tree structure may contain any number of levels of concepts within a given Application Domain. Each concept may be stored as a string of ASCII characters, although other types of identifiers may be used to represent or identify the concepts.

In addition to storing concepts, the hierarchical tree of the preferred embodiment also stores "words". A word is a character string that is indicative of a natural language word or phrase that describes a related concept. For example, the tree structure of FIG. 2 shows the words "Adjustable Rate", "Fixed Rate", "Fifteen-Year", and "Thirty-Year" in Blocks 214, 216, 218, and 219, respectively. These words are related to the Concept "Mortgage" in Block 204. The hierarchical tree further includes "word variants". Each word variant is a character string that provides an alternative description of a word. For example, a word variant may provide an abbreviation, an acronym, a slang term, alternative form or tense, or a foreign language expression, for a word to which it relates. The word variant "ARM" is shown in Block 220 related to the character string "Adjustable Rate" in Block 214. Each of the nodes of the hierarchical tree shown in FIG. 2, including each of the application domains, concepts, words, and word variants, may be referred to as a "locator element" because each node facilitates the location of other types of elements in a manner to be discussed below.

The hierarchical tree structure may be stored in a repository such as Repository 104. In the preferred embodiment, Repository 104 is implemented using the Unisys Universal Repository (UREP) commercially available from the Unisys Corporation, although other types of repositories could be utilized including, but not limited to, a Microsoft Repository commercially available from the Microsoft Corporation. Unisys Universal Repository (UREP) is a fully object-oriented repository for providing access to, concurrent sharing of, and immediate update support of all objects stored within the repository. For more information on the UREP system from Unisys, see the UREP Technical Overview, Document Number 8807 6971-000 available from the Unisys Corporation, and which is incorporated herein by reference in its entirety.

Within Repository 104, each of the locator elements is stored as an object. Each of the branches of the hierarchical tree structure is implemented by creating a relationship between two objects. However, one skilled in the art will recognize that other ways of representing the tree structure are available. For example, each application domain, concept, word, and word variant could be stored as a respective identifier occupying a predetermined storage location within the repository, with pointers between the storage locations used to represent the relationships between the various nodes of the tree. Still other implementations of the hierarchical tree structure will be apparent to those skilled in the art.

In the preferred embodiment, Repository 104 stores other types of objects besides those discussed above. Each of these other objects could store data that represents, describes, and/or models virtually anything. For example, each of the other objects could store an actual document. Alternatively, selected ones of the other objects could store meta-data that describes a document, wherein the actual document text is stored in a document repository residing within either Memory 102, within Mass Storage 110, or within the storage of a remote data processing system. As another example, objects could be used to model and/or store information about a particular business.

The system of the preferred embodiment includes objects that each stores meta-data about a respective reusable software construct. These objects, which are referred to as "asset elements", each represents and describes a respective code, data, or system software component. For example, an asset element may be used to store meta-data about a software program. Another asset element may store information about a database. Yet another asset element may store descriptive data about a particular system resource, such as a directory within a data processing system. The information stored in the asset elements could include the location of the respective software component, revision histories, the name of the author, the language used to implement the software module, and the like. Relationships between the code modules, for example, calls between code components, or references to data modules, are modeled by creating relationships between the respective asset elements that represent and describe the related modules. These relationships are similar to the relationships existing between the locator elements. This use of asset elements forms the basis of an object management system that can aid an Information Technology (IT) group in managing existing software components, and in developing new components that interface to existing components.

As discussed above, the software components being managed may reside within Memory 102 of Data Processing System 100, but are more likely stored in the memory of a remote data processing system (not shown). The implementation details of an object management system of this type are largely beyond the scope of this invention, but are described in detail in the co-pending patent application entitled "Object Management System Supporting the Use of Application Domain Knowledge Mapped to Technology Domain Knowledge" which is referenced above, and incorporated herein by reference in its entirety.

Figure 3:
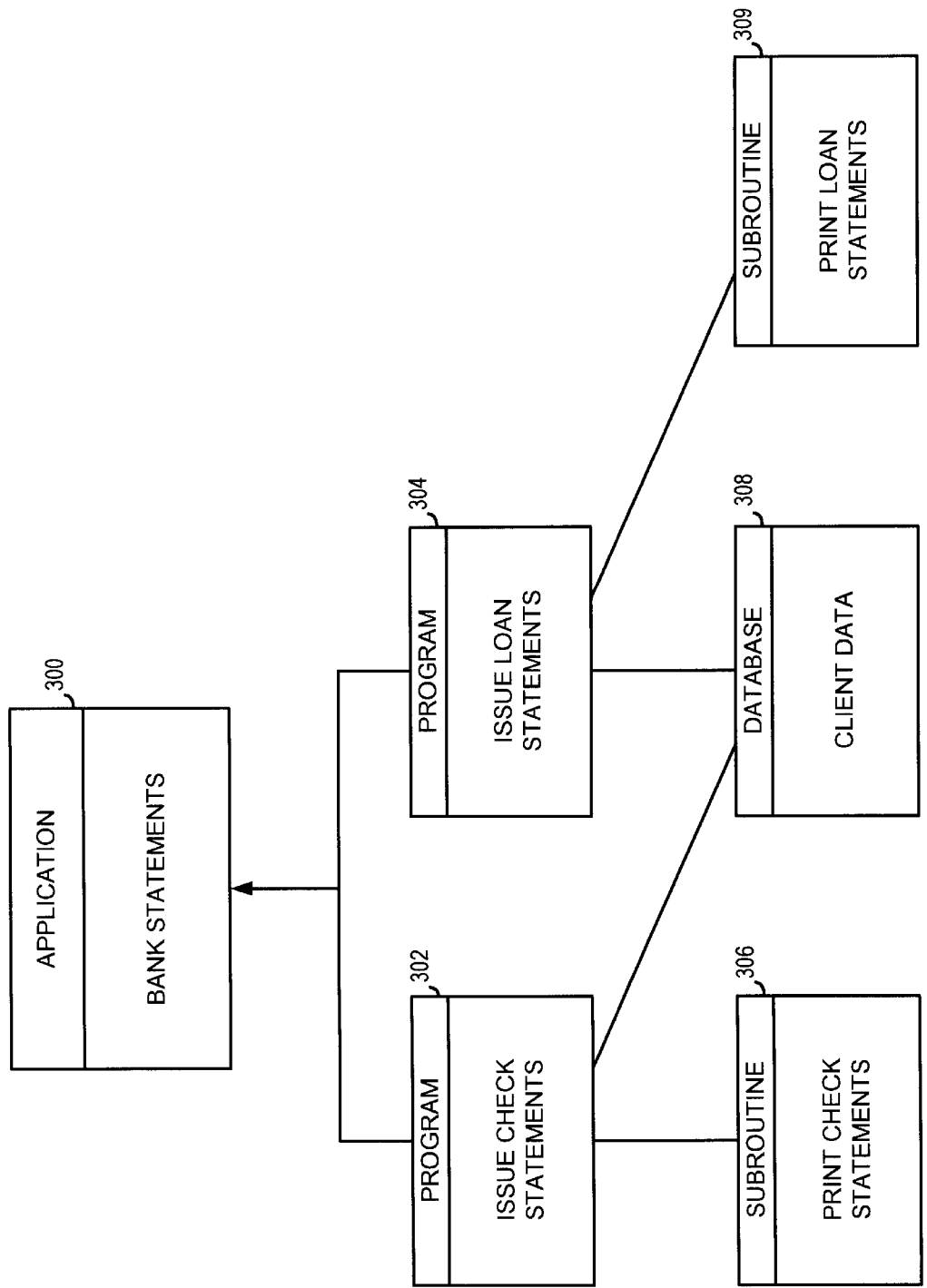
FIG. 3 is a block diagram illustrating an example of the use of asset elements, and relationships created between asset elements.

FIG. 3 is a block diagram illustrating an example of the use of asset elements, and relationships created between asset elements. Asset elements of different types exist in the system of the preferred embodiment, just as locator elements of different types are shown in FIG. 2. For example, FIG. 3 illustrates an asset element of the type "application" that represents and describes a group of programs (an application) that is called "BankStatements". This asset element, which is shown in Block 300, is related to elements that represent programs included in the banking application. These elements are shown as program elements "Issue CheckStatements" and "Issue LoanStatements" in Blocks 302 and 304, respectively. This model therefore represents and describes a banking application for generating bank statements, wherein the application includes two programs, each of which performs a function of the banking application.

Each of the program elements is also related to other asset elements. For example, program element "Issue CheckStatements" is related to asset elements of types "Subroutine" and "Database" in Blocks 306 and 308, respectively. This represents the fact that the program represented by Block 302 calls the subroutine "PrintCheckStatements" represented and described by the asset element shown in Block 306, and references database "ClientData" represented by the asset element of Block 308.

In the system of the preferred embodiment, each of the locator elements that stores a concept (that is, each concept element) may have a relationship with one or more of the asset elements. As stated above, these relationships are created using relationships between objects as is supported within the UREP object Repository in the manner discussed above. The relationships are selectively created so that each asset element may be linked to one or more concepts that are descriptive of the asset element. Any given asset element may be related to one or more concept elements, and any concept element may be related to one or more asset elements. In an alternative embodiment, relationships of this type could be created between asset elements and word and word variant elements, as well as between asset elements and concept elements.

Figure 4A:
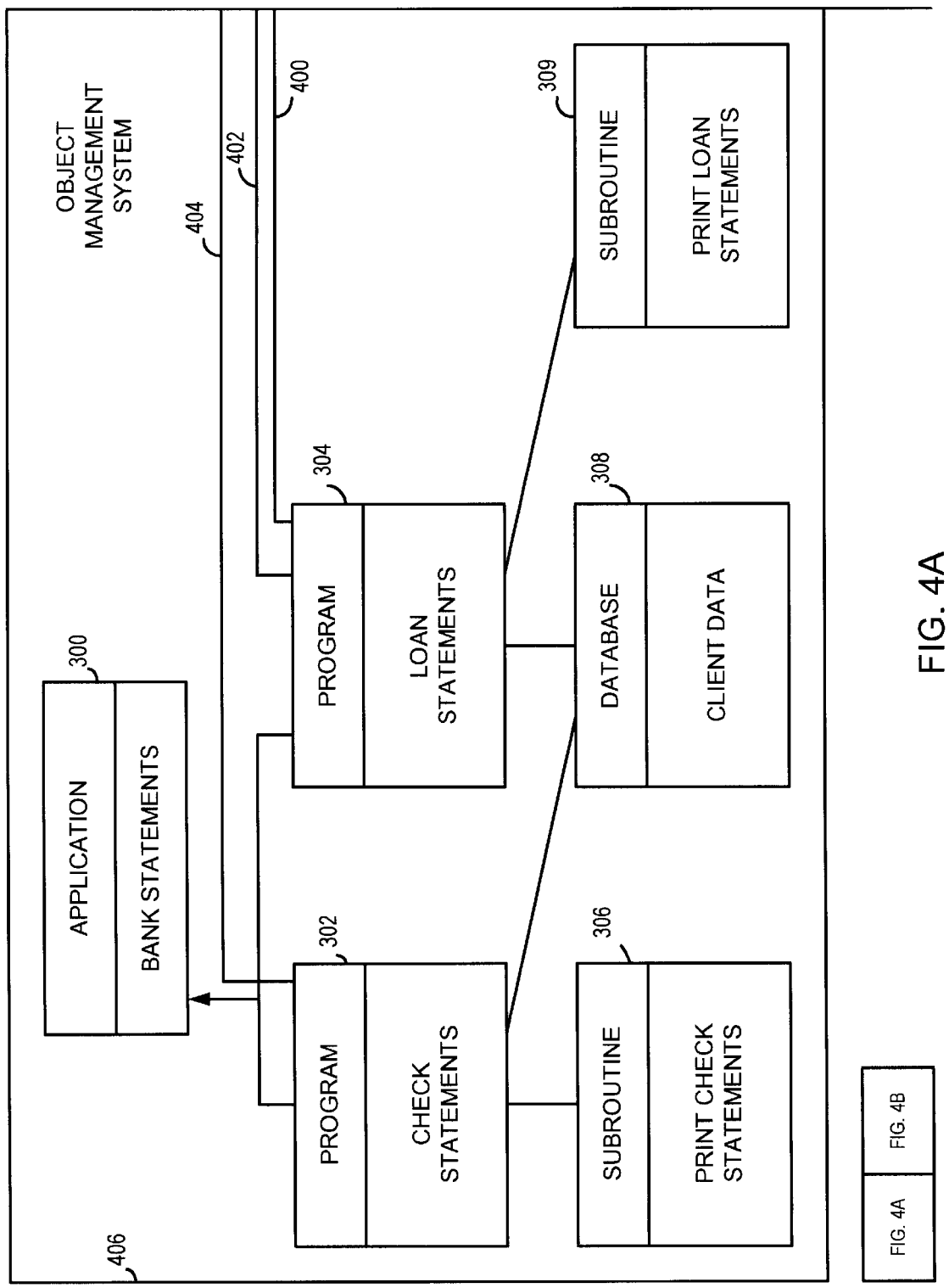
FIGS. 4A and 4B, when arranged as shown in FIG. 4, are a block diagram illustrating an example of concept elements being related to asset elements.
Figure 4B:
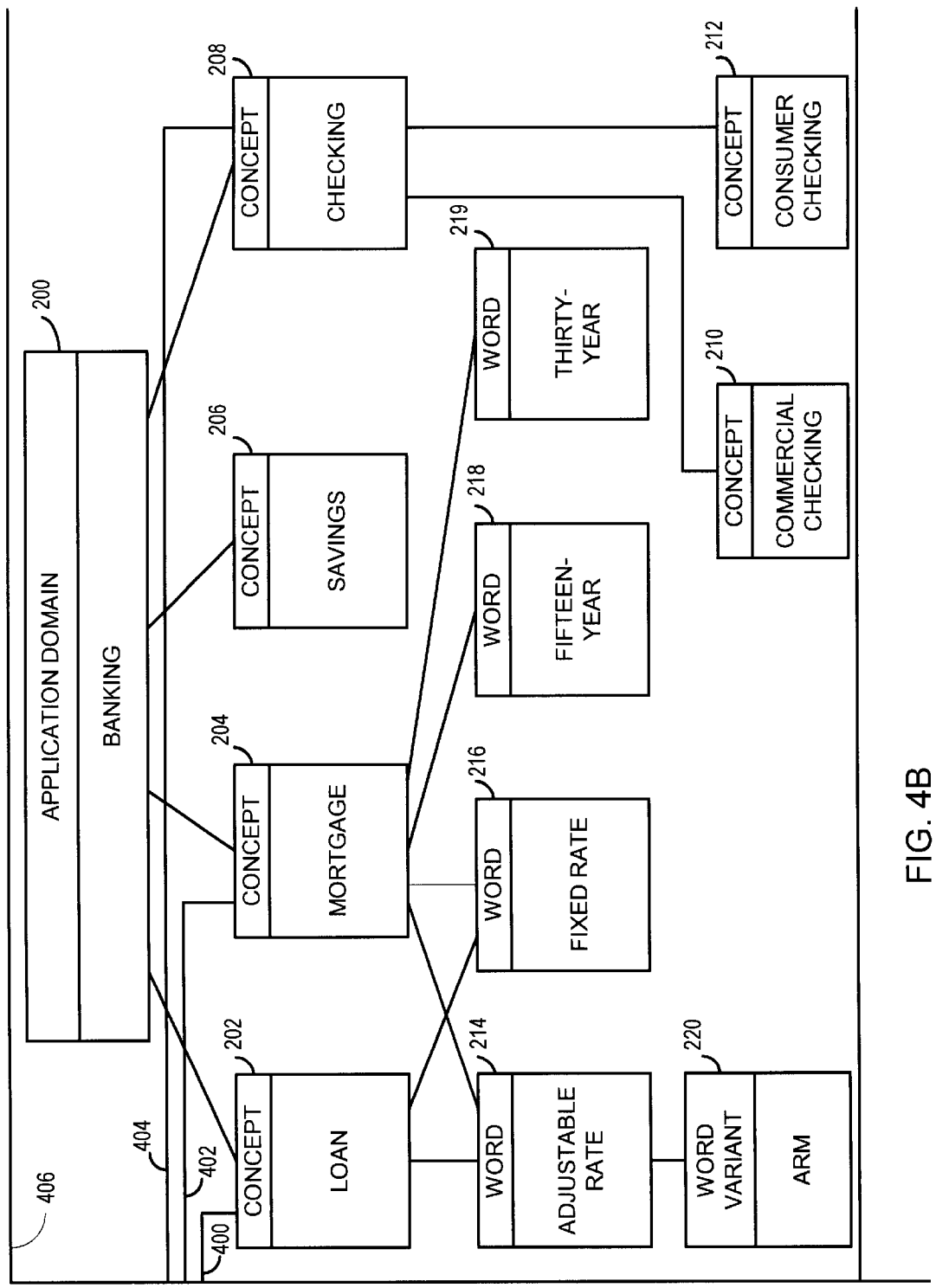

FIGS. 4A and 4B, when arranged as shown in FIG. 4, are a block diagram illustrating the concept elements of FIG. 2 and the asset elements of FIG. 3, and relationships that interrelate some of the concept elements to selected asset elements. For example, the concept element "Loan" in Block 202 is related to the software construct described by the asset element "Issue LoanStatements" in Block 304, as indicated by Line 400. This asset element is also related to concept element "Mortgage" in Block 204, as shown by Line 402. Likewise, concept element "Checking" in Block 208 is related to the asset element "Issue CheckStatements" in Block 302, as illustrated by Line 404. The asset and locator elements and the element relationships are included in Object Management System shown in block 406, used to manage the asset elements.

The relationships between the locator elements, as well as those between locator and asset elements, may be used to perform a natural language search on the asset elements. Using an interface such as User Interface 108, a user provides one or more character strings as a search query. The provided character strings are used by Search Means 112, which in the preferred embodiment is a software program called the "Element Locator". Element Locator searches the system "Lexicon" stored in Repository 104, wherein the Lexicon comprises each of the character strings stored in a word or word variant element. Element Locator also uses the character strings to further search the indicators stored in the concept elements. If one or more matches are found, Element Locator traverses relationships to locate any related concepts. In the preferred embodiment, the traversal of relationships between concept elements may be controlled by the user. That is, the user is allowed to specify a selectable number of levels within the hierarchy of the concept search tree that are to be traversed to locate additional child and/or parent concepts of any originally-located concept. The user is thereby able to selectably expand the scope of the search. The selectable nature of the search expansion capability is discussed further below, and is described in detail in the co-pending application entitled "System and Method for Developing a Selectably-Expandable Concept-Based Search" incorporated by reference above (hereinafter, "First Co-pending Application").

After an initial set of concept elements is located, Element Locator further traverses any relationships from the located concept elements to find any related asset elements. Using the meta-data stored in the selected asset elements, the user is allowed to gain information on the respective software constructs, including the location of the constructs within Data Processing System 100 or in some other remote data processing system. In this manner, software constructs related to a particular technology may be located using application domain terms instead of technology domain terms.

An object management system of the type described above is useful for gaining information about software elements relevant to a domain subject area of interest to a user. Once a set of software elements is identified, users may gain further understanding of those software elements in relationship to other interdependent software elements. The user may also gain information related to the precise specification of those software elements. Other uses and advantages associated with an object management system of the type described above are discussed in the co-pending application entitled, "Object Management System Supporting the Use of Application Domain Knowledge Mapped to Technology Domain Knowledge" referenced above (hereinafter, Second Co-pending Application).

As an example of a natural language search for locating one or more asset elements, assume a user is attempting to find all software constructs owned by a particular IT group relating to operations associated with adjustable rate mortgages. This is accomplished by the user supplying a character string such as "ARM" to the Element Locator user interface. Element Locator searches Repository 104 to locate this string, which is stored as a word variant element in Block 220. Element Locator traverses the relationship between this word variant element and the word element shown storing the character string "Adjustable Rate" in Block 214. Element Locator further traverses the relationship to locate any related concept elements. In this example, concept elements "Loan" in Block 202 and "Mortgage" in Block 204 are located. Finally, the relationships indicated by Lines 400 and 402 are traversed to locate the asset element "LoanStatements" in Block 304.

Figure 5:
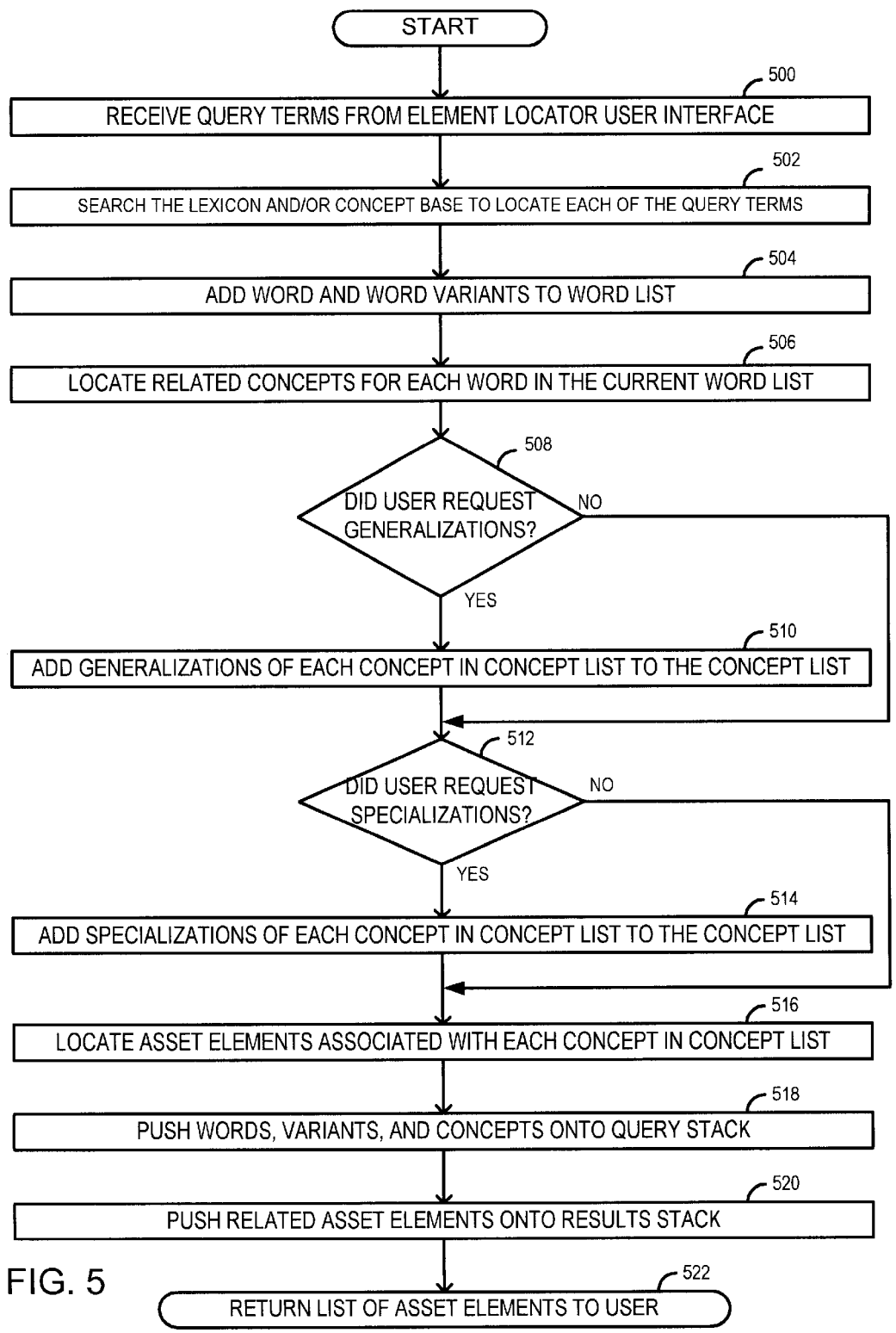
FIG. 5 is a flowchart of the method used by Element Locator to accomplish a search of the Repository.

FIG. 5 is a flowchart of the method used by Element Locator to accomplish a search of Repository 104. In step 500, Element Locator receives one or more query terms from a user. In step 502, Element Locator searches the Lexicon and the concept elements of Repository 104 for these character strings. If a character string is originally located in a word element, the word element is added to a list of word elements stored in memory, as shown in step 504. Otherwise, if the specified character string is located in a word variant element, all related word elements are located and stored in the list of word elements along with the located word variant element. Additionally, all character strings that are not located in Repository 104 are also added to the list in memory. Next, all related concept elements are located for each of the located word elements. This is illustrated in step 506. These concepts are stored in the same list in memory that contains the word and word variant elements.

Next, the user is allowed to control whether the scope of the search is to be expanded to include additional concepts. That is, the user may specify that in addition to any located concepts, Element Locator is to locate any concept elements having predetermined relationships to the located concept elements, such as parent, child, or sibling relationships. A parent concept is a concept directly related to the located concept and which exists one level of generalization above the located concept in the concept hierarchy. Similarly, a child concept is directly related to the located concept and exists one level of specialization below the located concept in the hierarchy. A sibling concept has the same parent as the specified concept. Specifying the inclusion of parent concepts adds more generalized concepts to those already included in the search. This is shown in steps 508 and 510, respectively. Similarly, specifying the inclusion of child concepts includes more specific concepts in the search, as is shown in steps 512 and 514, respectively. The additionally located concept elements are added to the list of locator elements being stored in memory.

Finally, for each located concept element, all asset elements are located, as shown in step 516. All specified and derived word, word variant, and concept elements are stored in an entry in a first stack in Memory 102, which is called the "Query Stack", as shown in step 518. Likewise, all asset elements are stored in an entry in an entry in a second stack in memory called the "Results Stack", as illustrated in step 520. The use of the Query Stack and the Results Stack will be discussed further below. The list of asset elements is provided to the user via User Interface 108 as illustrated in step 522.

As discussed above, although in the current system, asset elements are used to describe and model software constructs, similar objects could be defined to store meta-data on any type of information or system requiring management, cataloging, and/or indexing. By defining the relationships between natural language concepts and the objects storing meta-data, the catalog of meta-data as implemented by the asset elements may be searched using those natural language concepts defined by the locator elements. It may further be noted that although the asset elements of the preferred embodiment reside within Repository 104, this need not be the case. The objects being cataloged by the locator elements may reside on one or more remote systems.

According to one embodiment of the system described above, each Application Domain that is to be stored in Repository 104, including the related Lexicon of Word and Word Variant Elements, is initially created when the Object Management System is installed by system administrators. The Concept, Word, and Word Variant Elements are created according to the IT missions performed by the user system. Various Application Domains are available commercially from the Unisys Corporation, and those not available as pre-packaged Application Domains may be custom-created, and tailored specifically to an individual user's requirements. Once installed, a system administrator can create the necessary relationships between asset elements and ones of the locator elements based on user specifications.

Management and Modification of the Knowledge Base

Over the lifetime of the Object Management System 406, it will be desirable both to create new elements, and to create additional relationships within the knowledge base, wherein the knowledge base includes the various locator elements, asset elements, and relationships between various ones of the elements. As described in the First Co-pending Application, the Object Management System 406 provides a suite of interactive tools that allows a user to view the contents of Repository 104, and to further create additional elements, one element at a time. These tools further provide the capability to create additional relationships between elements, a relationship at a time. The interactive tool suite is generally used by system administrators familiar with the underlying system operations of the Object Management System. The end user may or may not be familiar with these interactive tools. Therefore, the current invention is provided as an interactive approach to creating additional concept indicators and relationships between those indicators within a knowledge base used to perform searches.

The current invention is based on the natural progression of events that is generally employed by a user to accomplish a search. Generally, a user has some preconceived notion of the search results that are desired and expected. The user composes a query using search terms that are thought to be related to those desired results. However, often times the search may initially be ineffective for a number of reasons. If the initial query does not produce the expected results, the user must modify the query and perform the search again. Several iterations of this nature may be necessary, with the user each time modifying a search query based on what was learned from the results achieved in the previous one or more search iterations. Eventually, the user may be successful in locating the particular items of interest.

In prior art search systems, unless a user can remember terminology employed in a previously-performed successful search, the user is forced to repeat the iterative process even if a search is similar to a search performed by the system in the past. That is, prior art search systems do not evolve to reflect user knowledge and preferences regarding the concepts and relationships stored within the knowledge base of the system. The current invention alleviates this time-consuming trial-and-error approach by providing a system that is capable of selectively "learning" from prior failed searches to create relationships between objects stored in Repository 104. The system can be used to create relationships between two locator elements, or between a locator element and an asset element.

The system operates by saving, for each iteration of a given search, the character strings provided by the user as the search query, the concepts located in Repository 104 using the search query, and the results of that query. In the system of the preferred embodiment, the information is saved in Memory 102 in several last-in, first-out, stacks. As discussed above, any provided query terms are saved along with all located word, word variant, and concept elements in the Query Stack. The query results are likewise stored in the Results Stack. One skilled in the art will recognize that although stacks are used in the current embodiment, any type of storage structure could be utilized to store this information, including arrays, queues, and the like. Information may be stored in multiple storage structures as in the current system, or may alternatively be stored in a single storage structure.

After any search iteration, a user is allowed to select an option provided by the Element Locator to view the saved query data and associated results for all prior iterations of the search. A user interface is provided that lists each of the user queries, and further lists any of the locator elements that were located as a result of the query. The user interface further lists any of the asset elements that are related to the selected locator elements. Using a standard "drag and drop" interface that is well-known in the art, the user is allowed to use this information to modify the information stored in Repository 104 so that new relationships are created between selected elements, or so that new locator elements are added to the Repository. For example, the user may selectively relate the asset elements located during the final search iteration to the concept elements associated with the initial query. In this manner, any future searches performed using terminology that is the same as, or similar to, the original query will locate the desired asset elements immediately, without the need to perform several search iterations. In this manner, the search tree will evolve to reflect the way in which the individual user employs the system lexicon to accomplish searches. The use of this system and method will be described further in reference to the following example.

Figure 6:
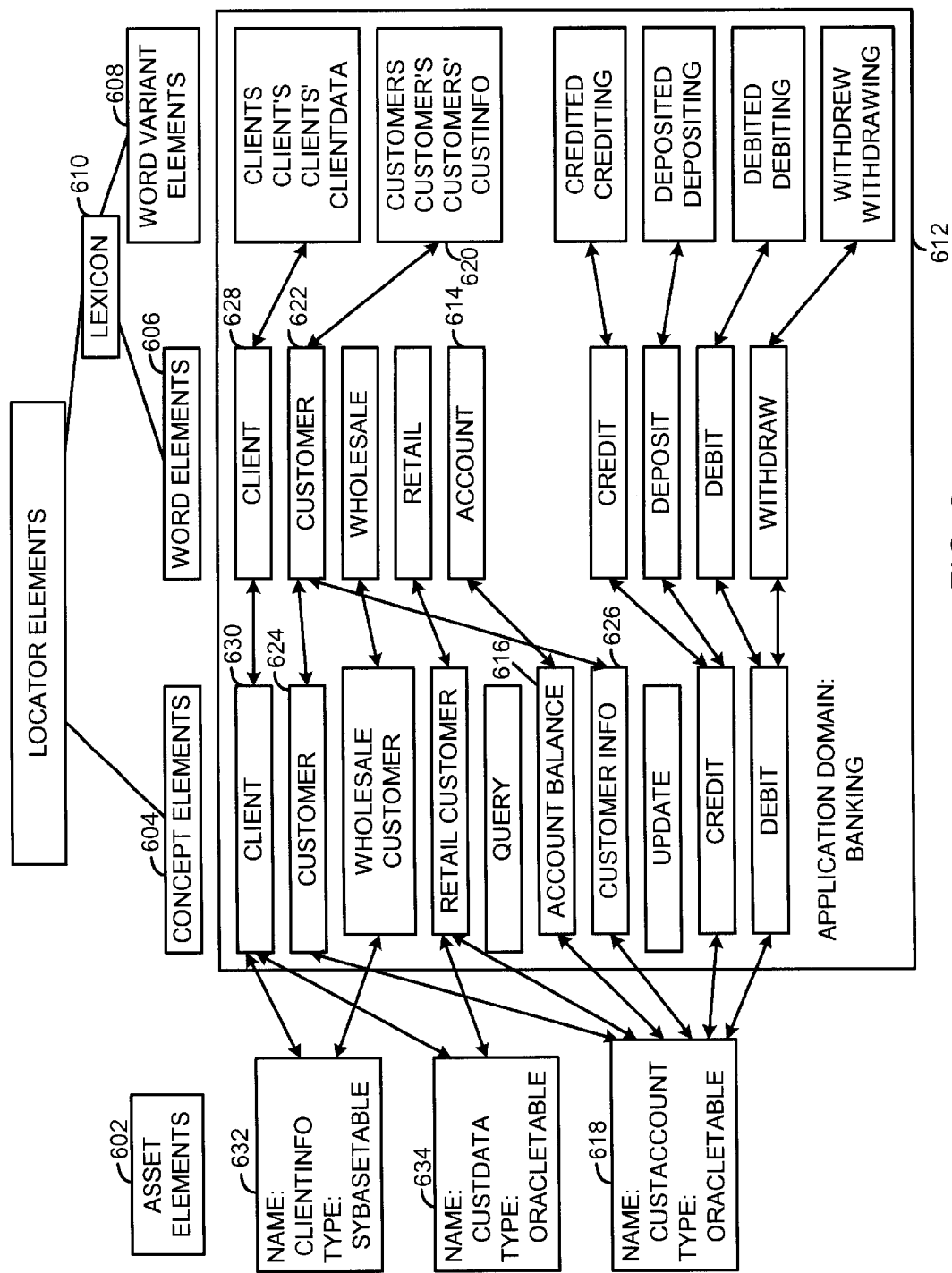
FIG. 6 is a graph showing a more detailed example of a hierarchical search tree structure for use in performing natural language concept searches to locate asset elements.

FIG. 6 is a graph showing a more detailed example of a hierarchical search tree structure for use in performing natural language concept searches to locate asset elements. Each of the blocks in FIG. 6 represents an element or a collection of elements stored in Repository 104. Asset elements are shown in column 602, and locator elements are shown in columns 604, 606, and 608. As discussed above, locator elements include concept elements, and further include the word and word variant elements that make up the system Lexicon 610. In this example, Repository 104 includes asset elements that describe and model software modules that are associated with a banking application. These asset elements are shown in column 602. These software modules are described by the concept, word, and word variant elements included in the Application Domain "Banking" illustrated by Box 612. Repository 104 could also store other Application Domains.

Assume a user developing a new software module associated with banking would like to determine the location of, and any software interdependencies that exist for, tables that store data associated with bank accounts. In particular, assume the user is interested in a particular Sybase Table known to exist on a system managed by the current Object Management System. The user utilizes Element Locator in the manner discussed above to perform a search on Repository 104. The user employs User Interface 108 to enter the search term "Account" as the initial query string. In the manner discussed above, Element Locator locates this search term in the word element "Account" shown in Block 614. This word element is related to the concept "Account-Balance" shown in Block 616, which is further related to the asset element "CustAccount" in Block 618. Element Locator displays information about the located asset element for the user, including the name and other descriptive data such as the fact that the asset element describes an Oracle table. In the current example, this is not the software component of interest to the user, and the user must therefore refine the query.

Assume the user refines the initial search by entering a second search term "Customers". This term, shown in Block 620, in a word variant element. Element Locator therefore locates the related word element, which in this example includes word element "Customer" in Block 622. Element Locator further locates the concept elements related to this word element, which includes "Customer" in Block 624 and "CustomerInfo" in Block 626. Finally, Element Locator locates the related asset elements for each of these concept elements. This once again includes asset element "CustAccount" in Block 618, which is not the element the user is attempting to locate.

The user makes a third attempt to refine the search, this time using the character string "Client" shown in Block 628.

Concept element "Client" in Block 630 is located, as are the related asset elements of "ClientInfo" and "CustData" shown in Blocks 632 and 634, respectively. The asset element "ClientInfo" stores meta-data describing the Sybase table that is of interest to the user, and the search is therefore considered complete.

Figure 7:
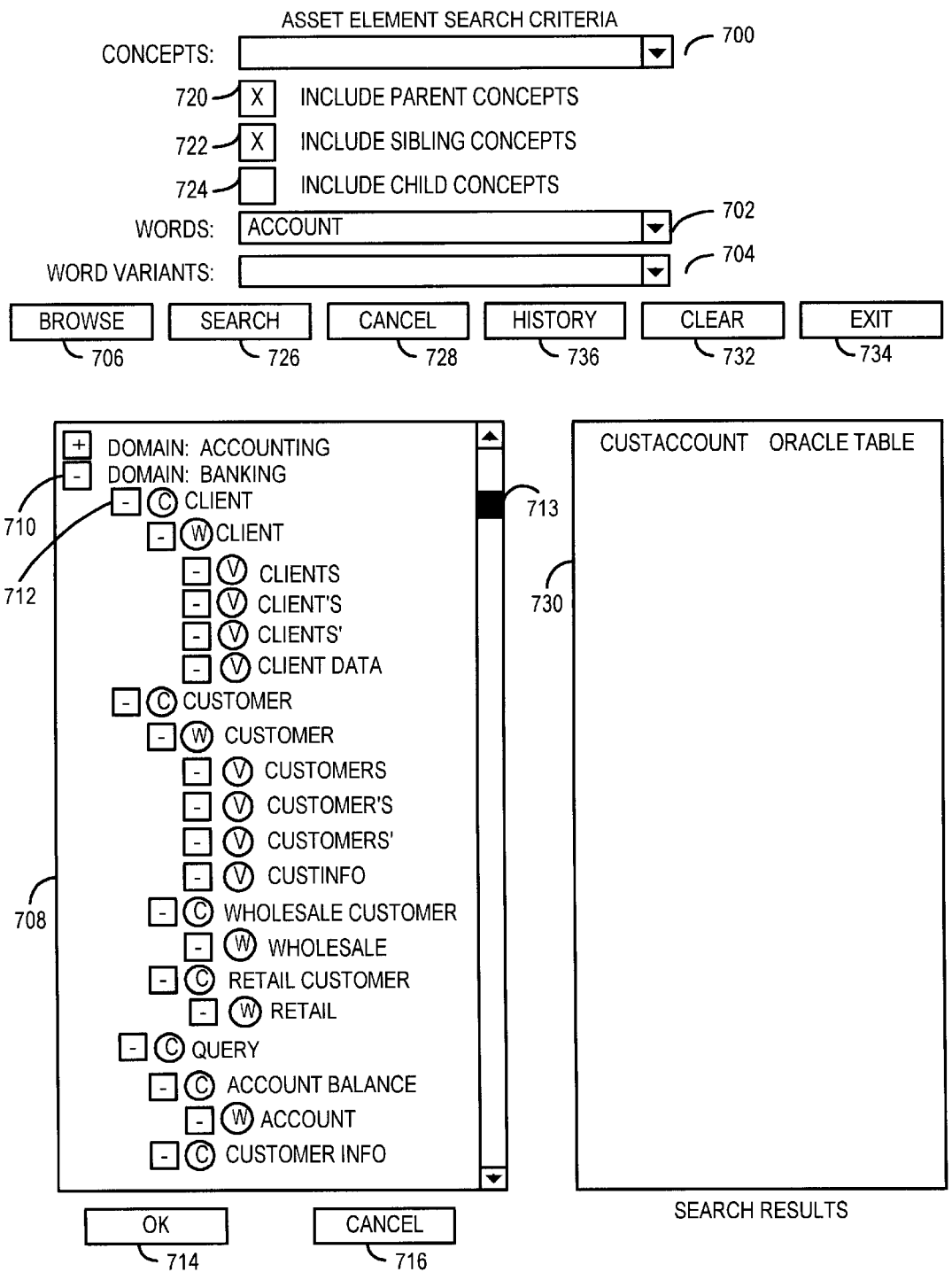
FIG. 7 is an illustration of the user interface for Element Locator.

FIG. 7 is a block diagram of the user interface for Element Locator. This interface is used to perform an iterative search of the type described above. A user may enter character strings in Block 700 to be used in searching for concepts. One or more character strings may be entered at one time, with multiple character strings being separated by commas. Similarly, the user is allowed to enter one or more character strings in each of Blocks 702 and 704 for use in searching for words and word variants, respectively. The user may enter character strings in one, or more than one, of the Blocks 700, 702, and 704 at one time.

Search character strings may be manually entered from a keyboard. Alternatively, the user may select the Browse function shown in Block 706 to obtain a visual display of the various concepts, words, and word variants stored in Repository 104. The user may select various concepts, words, and word variants from the display for use in performing the search. Window 708 shows a display that would be provided by selecting the Browse function. When this function is selected, all application domains stored in Repository 104 will be displayed in an abbreviated (contracted) form arranged in alphabetical order. The display of Window 708 includes application domains "Accounting" and "Banking".

The user may selectively expand the display shown in Window 708 for any of the application domains so that the display includes the hierarchy of concepts, words, and word variants existing within the selected application domain. For example, Window 708 shows a fully expanded view of the Application Domain "Banking" from FIG. 6. As is known in the art, display expansion is performed by selecting various ones of the expansion/contraction selectors shown provided to the left of each of the application domains, concepts, words, and word variants. For example, by selecting expansion/contraction selector 710, all concepts immediately below Application Domain "Banking" are shown, including "Client", "Customer", and "Query". By further selecting expansion/contraction selector 712, all concepts and/or words immediately below concept "Client" are displayed, and so on. The user may scroll through the list provided in Window 708 using Scroll Bar 713. Using this display and various shift, control, and arrow keys in a manner known in the art, the user may select one or more concept, word, and word variant elements from the display. The selected items will appear in highlighted text. By selecting the "OK" function in Block 714, the user then causes the selected concepts, words, and word variants to be entered in Blocks 700, 702, and 704, respectively, for use in performing the search. At any time, the user may also select the "Cancel" function in Block 716 to exit the Browse function.

In addition to selecting query terms in Blocks 700, 702, and 704, the user is also allowed to control the extent to which search expansion will occur. As discussed above, the user may choose to include all parent, sibling, and/or child concepts for each concept located during the search. This selection is performed by using Boxes 720, 722, and 724, respectively. Expanding the search to include parent concepts causes all concepts located immediately above a located concept within the concept hierarchy to be used in searching for asset elements. Similarly, expanding the search to include child concepts causes all concepts located immediately below a located concept within the concept hierarchy to be used in the search. Expanding the search to include sibling concepts causes any concept having the same parent as a located concept to be used in the search. Use of the search expansion capabilities is described in detail in the First Co-pending Application.

After completing entry of the query terms, either manually and/or by using the Browse function, the user initiates a search by selecting the "Search" function in Block 726. This causes the Element Locator to search the Repository 104 for each of the selected query terms. If a character string specified in Block 704 is located in a word variant elements, any related word elements are located. Word elements are further located by using the character strings specified in Block 702. For each word element located, any related concept elements are located. Concept elements are further located using the character strings specified in Block 700. Search expansion may be performed, if selected by the user in Boxes 702, 722, and/or 724, to include concepts related to those located concepts. This will cause additional concept elements to be located for purposes of the search. Finally, all concept elements located during the search are used to locate any related asset elements. At any time during the search process, the user may cancel a search by selecting the "Cancel" function shown in Block 728.

After the search is completed, the located asset elements are shown in Window 730. For the specified word "Account" shown in Block 702, the asset element "CustAccount" is shown in Window 730. This display includes the asset element name "CustAccount", and further includes the type of asset element, which in this case is "Oracle Table". Window 730 may also include other information such as the author of the element, and when the element was cataloged.

In the manner described above, the user may perform multiple search iterations by selecting different query terms in Blocks 700, 702, and/or 704, then re-selecting the "Search" function in Block 726. After each iteration, any located asset elements are shown in Window 730. During each search iteration, element locator will store the query terms in the Query Stack, including any word variant, word, and/or concept elements located during the search. Asset elements located during the search are stored in the Results Stack. Selection of the "Clear" function in Block 732 clears the Query and Results Stacks so that an entirely new search may be initiated. At any time, the search display of FIG. 7 may be exited by selecting the "Exit" function shown in Block 734.

The Element Locator user interface further allows the user to selectively modify the knowledge base by selecting the option shown as the "History" in Block 736. In response to selection of this option, Element Locator provides a display related to the history of the current search. This knowledge base modification function may be selected at any time during the search process.

Figure 8:
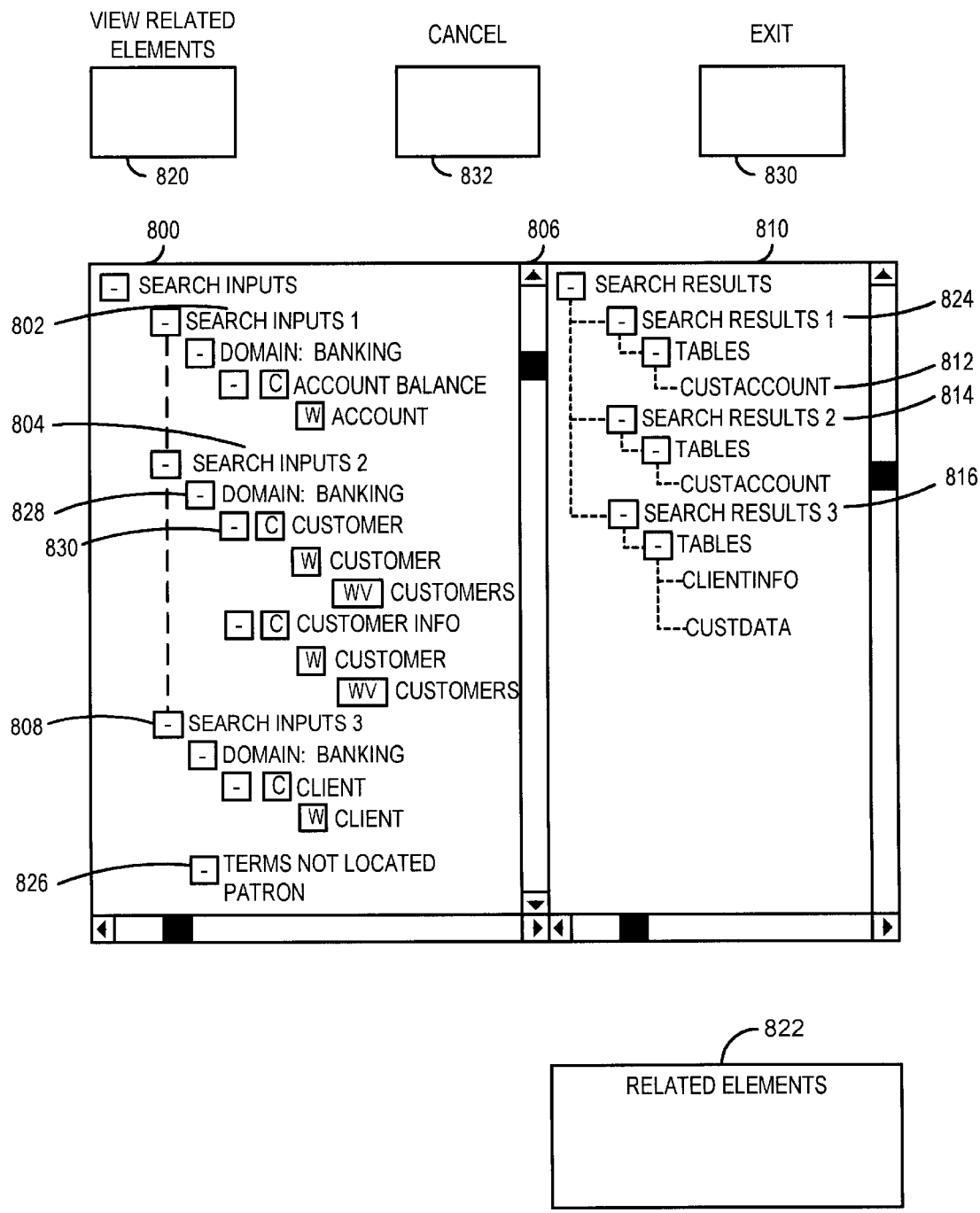
FIG. 8 is an illustration of the user interface provided to facilitate modification of the knowledge base.

FIG. 8 is an illustration of the user interface provided to facilitate modification of the knowledge base included in the search tree stored within Repository 104. Window 800 displays the locator elements located during each iteration of the search, as is recorded in the Query Stack. This can best be illustrated by returning to the above example provided during the description of FIG. 6. During search iteration one of this example, the user supplied the term "Account". This resulted in location of the word element storing the character string "Account", and the concept element storing the string "AccountBalance". These locator elements are shown arranged in the hierarchical manner in which they are organized in FIG. 6, and are listed as "Search Inputs 1" 802, correspond to the first search iteration. Similarly, during the second search iteration of the above example, the user supplied the term "Customers". This located the word variant element storing the term "Customers", and further resulted in location of the word element "Customer", and the concept elements "Customer" and "Customer Info". These terms are therefore displayed as "Search Inputs 2" 804, and so on.

In the current example, the search inputs provided by the user are very simple, involving only a single word or word variant element. However, as discussed above, many word, word variant, and concept elements may be provided during a single search iteration, such that the portions of the search tree traversed during a single search iteration may include multiple concept domains, or a large part of a single concept domain. The user may scroll through the display of Window 800 using scroll bar 806 to display the entire list of locator elements. The user may also expand and contract any selected portion of the display in Window 800 using the expansion/contraction selectors to the left of each locator element. For example, hitting the "-" in Block 808 to the left of "Search Inputs 3" will cause contraction of the display so that all items associated with iteration 3 are hidden.

The display in Window 810 is similar to that shown in Window 800, but instead displays asset elements located during each of the search iterations, as obtained for the list stored in the Results Stack. For example, in the above illustration, the asset element "CustAccount" was located in response to the user specifying "Account" as the query term. This is shown located as Search Results 1 812. This same search results was obtained during the second search iteration, and is therefore shown as Search Results 2 814. The search results obtained during the third search iteration in response to the user query "Client" is shown as Search Results 3 816. It may be noted that the search results are arranged according to type. For example, the current search results are all categorized as "Tables". In the current implementation, other types of categorizations for asset elements may include "Programs", "Subroutines", "Applications", and etc. In a manner similar to that described with respect to Window 800, the display of Window 810 includes expansion/contraction selectors for allowing a user to selectively expand and contract portions of the display in a manner known in the art.

Using a standard user interface, the user is allowed to select any one or more of the asset elements located in Window 810. This selection could be accomplished, for example, by highlighting one or more asset elements using the "control", "shift" and "arrow" keys in a manner known in the art. Alternatively, the selection may be made using a pointing selection device such as a mouse. Other ways of making the selection will be obvious to those skilled in the art. The user is then able to "drag" the selected asset element(s) to a desired row in Window 800 and "drop" them in the proximity of a selected one of the locator elements. This specifies that a relationship is to be formed between a concept element associated with the selected one of the locator elements and the one or more selected asset elements. This will be discussed further below in reference to the current example.

According to the preferred embodiment, the above described association operation may be performed on a group of locator elements as well as on a single locator element. Using the "control", "shift" and "arrow" keys or a point and click device, a group of elements may be selected in Window 800. These selected concept elements are shown highlighted in Window 800. A second group of one or more asset elements may then be selected in Window 810 in the manner described above. Using the "drag and drop" interface, the group of asset elements may be dropped in proximity to any one of the elements highlighted in Window 800. This specifies that an association is to be formed between each asset element in the group defined in Window 810, and a concept element associated with each locator element specified in Window 800.

The functionality described above may be illustrated by returning to the current example. Assume the user wants to relate the query term specified in the first search iteration to the successful search results obtained in the final search iteration. That is, the user wants to associated the term "Account" to the tables "ClientInfo" and "CustData". The user selects the asset elements "ClientInfo" and "CustData" in the manner described above, then uses the drag and drop interface to drag the selected elements adjacent to the term "Account". Since the Repository of the preferred embodiment stores relationships between concepts and asset elements, this drag and drop operation specifies that relationships are to be formed between the concept element "AccountBalance", which is directly related to word element "Account", and the two selected asset elements "ClientInfo" and "CustData". In an alternative embodiment in which relationships are stored between word and asset elements, performing the above operation would specify the creation of relationships that directly link word element "Account" with the selected asset elements.

In a manner described above, the user may select a group of locator elements, for example, "Account" and "Customers". Subsequently performing the above-described drag and drop function to either locator element specifies that relationships are to be created between the selected asset elements "ClientInfo" and "CustData" and each of the concept elements "AccountBalance", "Customer", and "CustomerInfo".

At any time, the user may view the asset elements that are related to a selected concept element. This is accomplished by selecting a concept element in Window 800 in the manner discussed above, then selecting the "View Related Elements" function in Block 820. According to one embodiment, this function selection may also be accomplished by a "right click" of a pointer selection device such as a mouse as is known in the art. This causes a list of any asset elements that are related to the selected concept element to appear in Window 822. In the preferred embodiment, the concept elements are grouped according to element type in a manner similar to that shown in Window 810. The display may be expanded and contracted in a similar manner to that described above. If the user has specified that new relationships are to be created, the newly-related elements appear in bold in Window 810. In a similar manner, the user may select an asset element from Window 810, then select the "View Related Elements" function in Block 820. This results in a list of related concept elements being displayed in Window 822. The "View Related Elements" function allows the user to view relationships already existing within the system, and to further view relationships that have been specified for creation.

In the preferred embodiment, the "View Related Elements" function, as well as the other display functions related to FIG. 8, use a local copy of elements retrieved from Repository 104 and stored in a buffer in Memory 102.

According to another aspect of the invention, any word variant, word, or concept element provided during any search iteration that is not located in Repository 104 is shown in Window 800 of the user interface display of FIG.

8. These terms are shown under the heading "Terms Not Located" below the Search Input corresponding to the appropriate search iteration. For example, assume in the above illustration that in addition to the term "Client", the user also provided the term "Patron" during the third search iteration. This term was not located in any locator element in Repository 104. As a result, an entry "Terms Not Located" 826 is provided under "Search Inputs 3" with the term "Patron" appearing below this heading. If this had been the only term provided during the third search iteration such that no search results were obtained, an entry for "Search Inputs 3" would appear in Window 800, but no associated "Search Entry 3" for search results would appear in Window 810.

The user is allowed to select any of the terms not located during any search iteration for inclusion in the knowledge base. That is, the user may specify that one or more new elements are to be created using these new terms. This is performed by selecting one or more terms in the manner described above, then positioning them at a desired location within the locator element network. For example, if the term "Patron" is to be created as a new concept element, this term is selected, then dragged to Row 828 indicating the Banking Domain. Positioning the term at this location causes a new concept element to be created as a child of the Banking Domain locator element, and at the same level in the hierarchy as concept "Customer". A relationship is created between the new element and the element indicative of the Banking Domain. Alternatively, the user may position the term at row 830 in proximity to concept element "Customer" to create a new word element "Patron" that exists immediately below concept "Customer" in the hierarchy, and which is related to concept element "Customer". In a similar manner, the user may position the new term in proximity to an existing word element to create a new word variant element that is related to the word element. Multiple such operations may be performed to add one or more concept, word, or word variant elements to the Repository 104.

The user may also utilize the user interface of FIG. 8 to specify the deletion of one or more relationships between an asset element and a locator element. This may be accomplished by selecting either an asset element or a locator element, then selecting the "View Related Elements" function of Block 820. The list of related elements is shown in Window 822 as discussed above. The user may select one or more of the related elements shown in Window 822, then select the "Delete" key to delete the relationship(s) between the selected locator and asset element(s).

According to yet another aspect of the invention, the user is allowed to specify that new relationships are to be created between locator elements within Repository 104. This can be accomplished by selecting one or more locator elements in Window 800, then using the drag and drop function to position the elements at a new position within the concept network of Window 800. For example, assume the user wished to relate the word element "Client" to the concept element "Customer". This is accomplished by selecting the word element "Client" in Window 800, then positioning the selected element at row 830 in proximity to concept element "Customer" using the drag and drop interface. This specifies that a relationship is to be created between the word element "Client" and concept element "Customer".

When the user has completed the specification of all changes that are to be made to the knowledge base stored in Repository 104, the user selects the "Exit" function shown in Block 830. This causes the changes to be stored in Repository 104. Alternatively, the user may exit the display of FIG. 8 without committing changed by selecting the "Cancel" function shown in Block 832.

Figure 9:
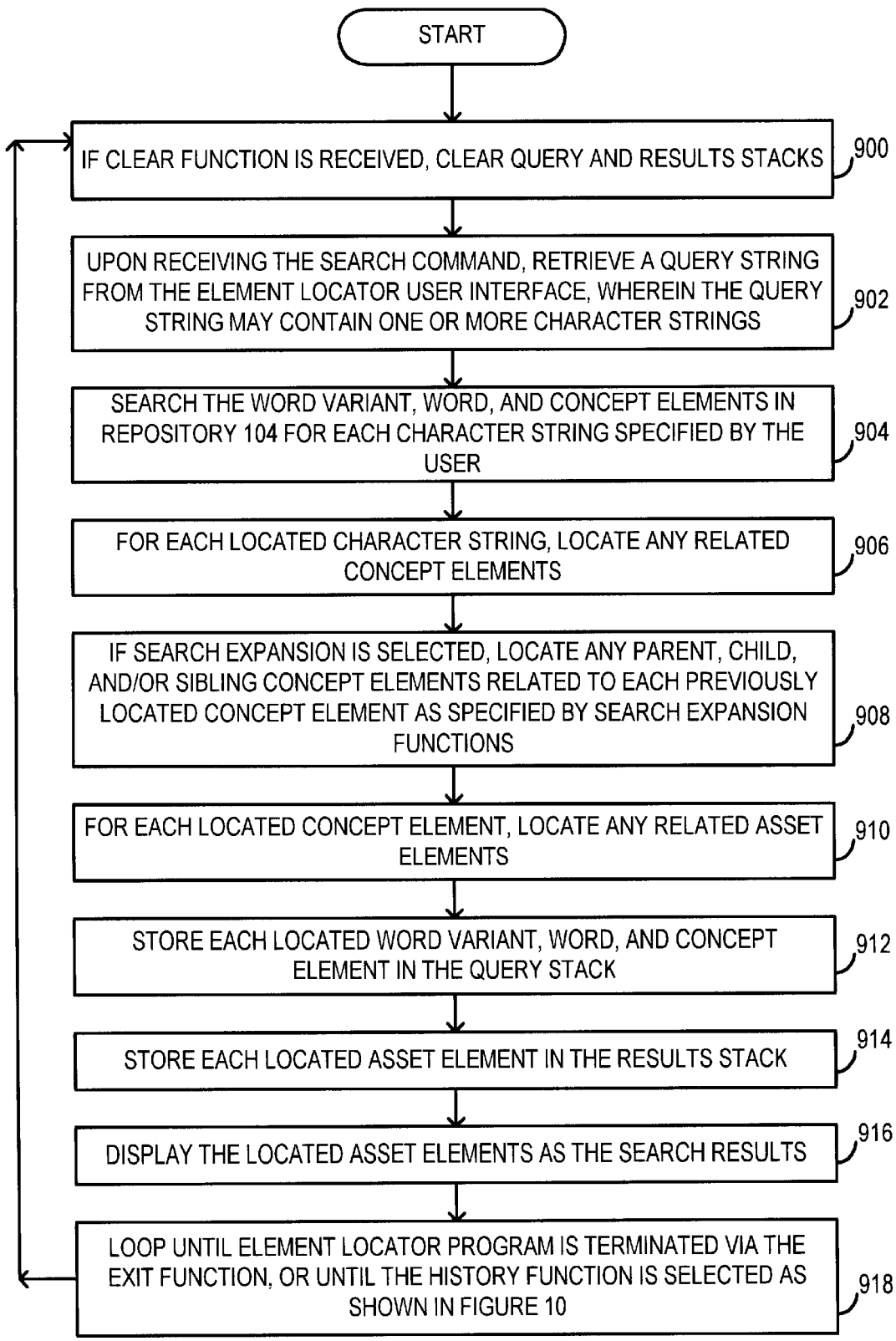
FIG. 9 is a flowchart of the functionality provided by Element Locator during a search;s

FIG. 9 is a flowchart of the functionality provided by Element Locator during a search, including the steps needed to store query and search information needed to provided the functionality supported by the current invention. In step 900, if the Clear Function is specified by the user, the Query and Results stacks are cleared so that no entries are stored. Next, in step 902, if the search function is issued, a query string containing one or more character strings is retrieved from the user interface. The received character strings are used to search the Repository to locate any word variant, word, or concept elements that stores a specified term, as shown in step 904. For each query term that is found, any related concept elements are located, as illustrated in step 906. As discussed above, if a character string is located in a word variant element, this step involves first locating a related word element, then locating a related concept element. If search expansion is selected such that parent, child, and/or sibling concepts are to also be utilized in the search, these additional concepts are located for each of the originally located concept elements. This is shown in step 908. For each concept element located, any related asset elements are located, as depicted in step 910. The located word variant, word, and concept elements are stored in the Query Stack in an entry associated with the current search iteration, as shown in step 912. Likewise, the located asset elements are stored in the Results Stack in an entry associated with the current search iteration, as indicated in step 914. The results are provided to the user, as shown in step 916. The search iterations may continue indefinitely until the user either terminates the Element Locator using the Exit function, or until the user selects the History function to initiate modification of the knowledge base stored in Repository 104, as is illustrated in step 918.

One skilled in the art will recognize that the functionality depicted in FIG. 9 may be implemented in many different ways without departing from the scope of the invention. For example, the query and search results data may be stored in many different formats and storage structures, and the use of multiple stacks is merely a design choice. Likewise, the ordering of steps included in the flowchart of FIG. 9 is, in many instances, a design decision, and should not be viewed as limiting.

Figure 10:
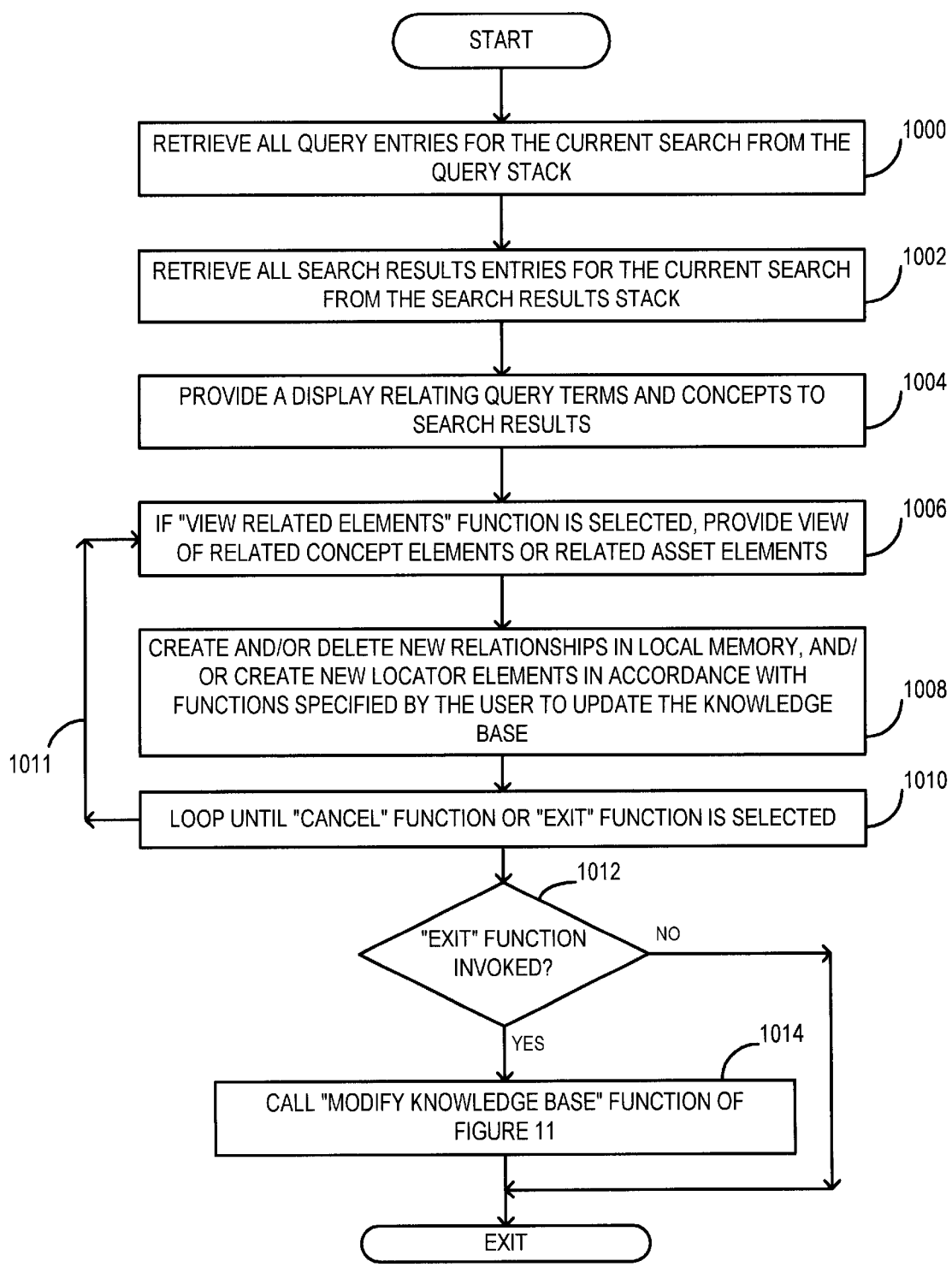
FIG. 10 is a flowchart of the steps performed to allow modification of the knowledge base.
Figure 11:
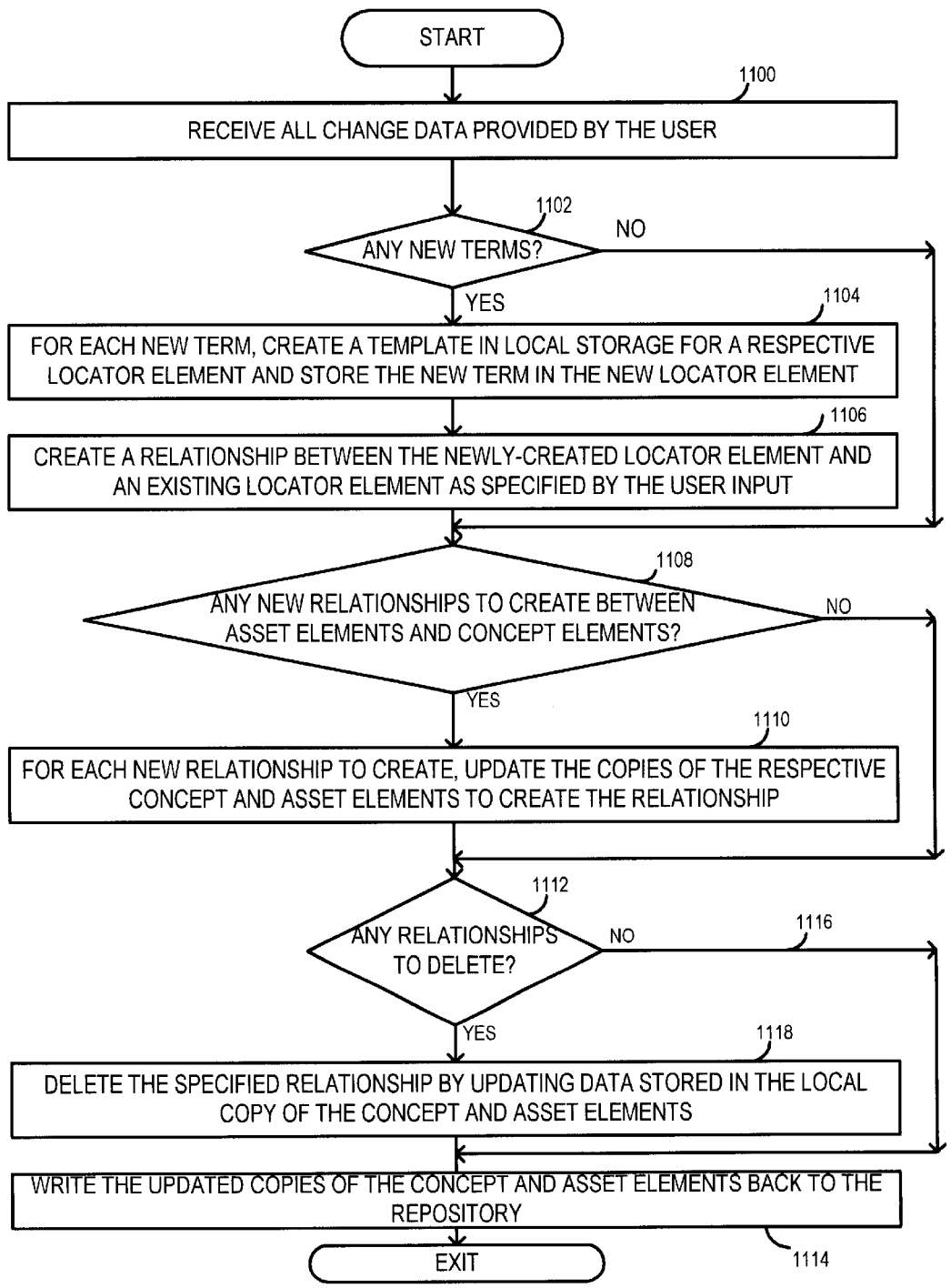
FIG. 11 is a flowchart illustrating the steps performed by Element Locator to create or delete relationships between the asset and concept elements, and, if necessary, to create new word and/or concept elements.

FIG. 10 is a flowchart of the steps performed to allow modification of the knowledge base in accordance with the current invention. In steps 1000 and 1002, all query entries and search results entries are retrieved from the Query Stack and the Results Stack, respectively. In step 1004, a display is provided via the user interface relating the search terms provided by the user, including any locator elements located during the search, to respective search results entries. It may be noted that some query entries may not be related to associated entries in the search results stack. This will occur, for example, when a query term is provided that is not located in the Repository. In step 1006, if the "View Related Elements" function is selected, a display is provided for any concept elements related to a selected asset element, or any asset elements related to a selected concept element. The user is allowed to utilize both the initially provided display of query and results terms, and/or the display of related elements to create relationships or new locator elements, and/or to delete existing relationships. This is shown in step 1008. In the preferred embodiment, this modification function is performed using a drag and drop interface, however, many other types of user interfaces are available. For example, the user could modify the display using cut and paste functions, or by re-typing the desired information. The user is allowed to continue modifying the display until the "Exit" or the "Cancel" function is selected. This is shown in step 1010, and is indicated by arrow 1011. If the "Exit" function is selected, as indicated by decision step 1012, the "Modify Knowledge Base" routine is invoked to commit the changes to the Repository 104, as shown in step 1014, and processing is completed. This function is illustrated in FIG. 11. Otherwise, the "Cancel" function is selected, and the user display of FIG. 8 is exited without committing the changes.

FIG. 11 is a flowchart illustrating the steps performed by Element Locator to create or delete relationships between the asset and concept elements, and, if necessary, to create new word and/or concept elements. The changes are initially made to copies of the element data that resides with a local storage in Memory 102 that is associated with Element Locator. In step 1100, the changes made to the user display are retrieved from the user interface. A check is made to determined if any new terms are specified that were previously not stored in Repository 104, as indicated in decision step 1102. For each new term specified, a new locator element template is created in local storage to store the character string, as indicated in step 1104. The type of element created will be based on how the user positions the new term within the concept hierarchy, as is described above. A relationship is created between the new element and an existing element within the knowledge base, as specified by the user. This is accomplished by updating information in both the newly-created element, and in the existing related element within the element data located in local storage. This is shown in step 1106. Next, a check is made to determine if any relationships are to be created between concept and asset elements, as shown in step 1108. For each relationship that is to be created, copies of the elements are updated in local storage to reflect the addition of the new relationship, as shown in step 1110. As discussed above, relationships may be implemented in a variety of ways, including through the use of pointers. Next, a check is made to determine whether any relationships between asset and concept elements are to be deleted, as indicated by decision step 1112. If not, processing continues at step 1114, as indicated by arrow 1116. If one or more relationships are to be deleted between asset and concept elements, data stored in the local copy of these elements is modified to delete the specified relationship, as shown in step 1118. Finally, all updated copies of the elements are stored in Repository 104 to save the desired changes, as shown in step 1114.

The above examples illustrate the use of the current invention in creating objects stored in an object-based repository, wherein the objects represent words, word variants, concepts, and other types of elements. However, the current invention could be utilized to selectively allow modification of any search tree used in any search system. This is true regardless of the type of storage structure used to implement the nodes of the tree, and whether or not all nodes are represented and stored in the same way as the same type of node or whether the nodes are represented using different types of constructs (e.g., different types of elements), as in the embodiment described above. This is likewise true regardless of the manner in which the branches of the tree are represented. Having described an exemplary embodiment of the invention in the drawings and accompanying description, those skilled in the art will recognize that various modifications to the exemplary embodiment could be made without departing from the scope and spirit of the claims set forth below.

What is claimed is:

1. For use in a system having a memory for storing objects, first ones of the objects being asset elements that are each being cataloged by being associated with one or more natural language concepts, second ones of the objects being locator elements each for storing indicators indicative of a respective one of the natural language concepts, the memory further for storing association indicators each for relating a respective one of the asset elements to an associated one of the locator elements wherein the associated one of the locator elements stores an indicator indicative of a natural language concept descriptive of the associated asset element, a search system for use in searching for asset elements by specifying natural language concepts, the search system, comprising:

user interface means for receiving from a user one or more indicators each indicative of a natural language concept;

search means coupled to said user interface for searching the memory to locate all locator elements storing any of said one or more indicators received from the user, said search means further for searching the memory to locate, for each locator element that is located, any related asset element; and memory modification means coupled to said search means for allowing the user to create additional association indicators each to selectably relate a selected one of the located locator elements with a selected one of the located asset elements, and whereby said selected one of the located asset elements is newly-associated with an additional one of the natural language concepts.

2. The search system of claim 1, wherein said search means includes display means for displaying any of said located asset elements to the user, and wherein said user interface includes means for allowing the user to specify one or more additional indicators in response to said display means displaying said any of said located asset elements so that an additional iteration of the search may be performed to locate additional ones of the asset elements.

3. The search system of claim 2, wherein said search means further includes iterative means for allowing the user to perform any selectable number of additional iterations of the search.

4. The search system of claim 3, and further including storage means coupled to said search means, for storing, for each iteration of the search, said one or more indicators received from the user during said each iteration of the search, any locator elements located during said each iteration of the search, and any asset elements located during said each iteration of the search.

5. The search system of claim 4, wherein said memory modification means includes display means for displaying the contents of said storage means.

6. The search system of claim 5, wherein said memory modification means includes means for allowing the user to create said additional association indicators such that each of said additional association indicators may selectably relate a selected one of the located locator elements located during any said iteration of the search with a selected one of the located asset elements located during any other said iteration of the search.

7. The search system of claim 6, wherein said display means of said memory modification means includes drag and drop means for allowing the user to create said additional association indicators by positioning a selected one or more of said located asset elements in proximity to a selected one or more of said located locator elements.

8. The search system of claim 1, wherein the memory further stores locator element association indicators each for relating a first one of the locator elements to an associated second one of the locator elements, and wherein said memory modification means includes means for allowing a user to create additional locator element association indicators each for relating any said located locator element to a selected one of predetermined other ones of said located locator elements.

9. The search system of claim 8, wherein said search means includes search expansion means for allowing the user to selectively locate additional ones of the locator elements that have a predetermined relationship with any of said located locator elements, and wherein said additional ones of the locator elements are further used to locate additional ones of the asset elements that are each related to any of said additional ones of the locator elements.

10. The search system of claim 1, wherein said memory modification means includes locator element creation means for creating additional ones of said locator elements each for storing an indicator indicative of a natural language concept that was received from the user but not located in any one of the locator elements stored in the memory.

11. The search system of claim 10, wherein said locator element creation means includes means for creating additional association indicators for allowing said additional ones of said locator elements to be selectably related to selected ones of predetermined other ones of said located asset elements.

12. The search system of claim 10, wherein said locator element creation means includes means for creating additional ones of said locator element association indicators for allowing said additional ones of said locator elements to be selectably related to selected ones of said located locator elements.

13. The search system of claim 1, wherein said memory modification means includes deletion means for allowing the user to selectively delete one or more of the ones of the association indicators that associate one of said located locator elements with one of said located asset elements.

14. A system used to catalog groups of data signals, comprising:
   a storage device to store each of the groups of data signals, said storage device further to store concept indicators each indicative of a respective natural language concept, said storage device further to store relationship indicators each indicative of an association between a respective one of the groups of data signals and a respective one of the concept indicators;
   search means coupled to said storage device, said search means for searching said storage device to locate specified ones of said natural language concepts as specified by a user of the system, said search means further for locating, for each located one of said natural language concepts, any associated group of data signals as indicated by one of said relationship indicators; and
   relationship creation means coupled to said search means for allowing each of said located ones of said natural language concepts to be selectively newly associated with one or more located groups of data signals by selectively creating one or more new ones of said relationship indicators.

15. The system of claim 14, and further including concept indicator creation means coupled to said search means for use in selectively creating ones of said concept indicators for those ones of said natural language concepts that were specified by the user of the system, but that were not located in said storage devices.

16. The system of claim 15, wherein said relationship creation means includes means for creating one or more of said relationship indicators, each to selectively newly associate a respective one or more created ones of said concept indicators with a respective one of said one or more located group of data signals.

17. The system of claim 14, wherein said storage device further includes circuits to store concept relationship indicators, each of said concept relationship indicators for relating a respective one of said concept indicators to an associated other one of said concept indicators.

18. The system of claim 17, wherein said relationship creation means includes means for selectively creating ones of said concept relationship indicators between selected ones of said located ones of said natural language concepts.

19. The system of claim 17, wherein said search means includes search expansion means for selectively locating additional ones of said natural language concepts, wherein each of said additional ones of said natural language concepts have a predetermined relationship to any of said located ones of said natural language concepts, said search expansion means further for locating any of the groups of data signals associated with any of said additional ones of said natural language concepts.

20. The system of claim 14, wherein said relationship creation means includes interface means for allowing the user to view a list of said specified ones of said natural language concepts, for allowing the user to view a list of said located ones of said natural language concepts, and for further allowing the user to view a list of said one or more located groups of data signals.

21. The system of claim 20, wherein said interface means includes drop-and-drag interface means for allowing the user to selectively create ones of said relationship indicators by positioning a selected one or more of said located groups of data signals in proximity to a selected one or more of said natural language concepts listed within said list of said located ones of said natural language concepts.

22. The system of claim 14, wherein said search means includes iterative means for allowing said specified ones of said natural language concepts to be specified by the user of the system during multiple iterations of a search.

23. The system of claim 22, wherein said search means includes means for invoking said relationship creation means during any of said multiple iterations of a search to create said one or more new ones of said relationship indicators, each of said one or more new ones of said relationship indicators indicative of an association between one of said natural language concepts located during any of said multiple iterations of the search and any of said one or more located groups of data signals located during any of said multiple iterations of the search.

24. The system of claim 14, wherein said search means includes browse means for allowing the user to view each of said concept indicators stored within said storage device for use in selecting ones of said natural language concepts to be used in searching said storage device.

25. For use in a data processing system having a repository for storing locator elements each being indicative of a natural language concept, wherein the natural language concepts indicated by the locator elements are used to catalog data items by creating associations that each associate one of the data items with an associated one of the locator elements, the method comprising the steps of:
   (a) receiving an indicator indicative of a natural language concept;
   (b) searching the repository for one or more locator elements indicative of the natural language concept indicated by said received indicator;

(c) identifying all data items that are associated with each locator element located in step (b);

(d) repeating steps (a)–(c) a selectable number of times; and (e) associating a selected one of the locator elements located during any iteration of said step (b) with a selected one of the data items identified during any iteration of said step (c).

26. The method of claim 25, wherein step (e) may be repeated any selectable number of times.

27. The method of claim 26, wherein said step (e) may be performed following the completion of any iteration of said steps (a)–(c).

28. The method of claim 25, wherein the repository stores relationship indicators each for recording an association between two associated ones of the locator elements, and wherein step (e) includes the step of defining one or more new ones of the relationship indicators each to associate any selected one of said locator elements located during any iteration of said step (b) with a selected one of predetermined other ones of said locator elements located during any iteration of said step (b).

29. The method of claim 28, and further including the step of storing said one or more relationship indicators in the repository.

30. The method of claim 28, wherein said searching step further includes the step of selectively expanding the search to locate one or more additional locator elements each having a predetermined association to any of said one or more locator elements indicative of the natural language concept indicative by said received indicator.

31. The method of claim 25, and further including the step of creating a new one of the locator elements for any selected one of the natural language concepts received in step (a) but not stored in the repository.

32. The method of claim 25, and further including the step of selectively removing an association between a selected one of the locator elements located during any iteration of said step (b) and a selected one of the data items identified during any iteration of said step (c).

33. The method of claim 25, wherein the data processing system includes a drag-and-drop interface, and wherein step (e) is performed using the drag-and-drop interface.

* * * * *